United States Patent
Holenarsipur et al.

(10) Patent No.: US 10,553,179 B2
(45) Date of Patent: Feb. 4, 2020

(54) ELECTRONIC DEVICES WITH AMBIENT LIGHT SENSORS

(71) Applicant: Apple Inc., Cupertino, CA (US)

(72) Inventors: Prashanth S. Holenarsipur, Fremont, CA (US); Dong Zheng, Los Altos, CA (US); Serhan O. Isikman, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 73 days.

(21) Appl. No.: 15/699,941

(22) Filed: Sep. 8, 2017

(65) Prior Publication Data

US 2019/0080668 A1    Mar. 14, 2019

(51) Int. Cl.
| | |
|---|---|
| *G09G 5/10* | (2006.01) |
| *G01J 1/04* | (2006.01) |
| *G01J 1/42* | (2006.01) |
| *G01J 1/44* | (2006.01) |
| *H04N 5/33* | (2006.01) |

(52) U.S. Cl.
CPC .............. *G09G 5/10* (2013.01); *G01J 1/0437* (2013.01); *G01J 1/4204* (2013.01); *G01J 1/44* (2013.01); *H04N 5/33* (2013.01); *G01J 2001/448* (2013.01); *G09G 2310/0259* (2013.01); *G09G 2320/0626* (2013.01); *G09G 2360/144* (2013.01)

(58) Field of Classification Search
CPC combination set(s) only.
See application file for complete search history.

(56) References Cited

U.S. PATENT DOCUMENTS

| | | | |
|---|---|---|---|
| 8,912,480 B2 | 12/2014 | Pope et al. | |
| 2010/0283394 A1 | 11/2010 | Ong | |
| 2012/0153153 A1* | 6/2012 | Chang | G01C 3/08 250/338.1 |
| 2012/0170284 A1 | 7/2012 | Shedletsky | |

(Continued)

FOREIGN PATENT DOCUMENTS

| | | |
|---|---|---|
| CN | 102293057 A | 12/2011 |
| CN | 102967362 A | 3/2013 |

(Continued)

OTHER PUBLICATIONS

Zhang et al., U.S. Appl. No. 15/643,334, filed Jul. 6, 2017.

*Primary Examiner* — Deeprose Subedi
(74) *Attorney, Agent, or Firm* — Treyz Law Group, P.C.; G. Victor Treyz; David K. Cole

(57) ABSTRACT

An electronic device may be provided with a display mounted in a housing. The display may have an array of pixels that form an active area and may have an inactive area that runs along an edge of the active area. An opaque layer may be formed on an inner surface of a display cover layer in the inactive area of the display or may be formed on another transparent layer in the electronic device. An optical component window may be formed from the opening and may be aligned with an ambient light sensor such as a color ambient light sensor. The color ambient light sensor may have an infrared-blocking filter to block infrared light such as infrared light emitted by an infrared-light-emitting diode in the device. A light diffuser layer, light guide, and other structures may also be included in the ambient light sensor.

43 Claims, 16 Drawing Sheets

(56) References Cited

U.S. PATENT DOCUMENTS

| | | | |
|---|---|---|---|
| 2014/0197317 A1* | 7/2014 | Yang | G06F 1/3231 |
| | | | 250/341.8 |
| 2016/0054175 A1* | 2/2016 | Jia | G01J 1/4204 |
| | | | 250/216 |
| 2016/0085336 A1* | 3/2016 | Kim | G06F 1/1643 |
| | | | 345/174 |
| 2016/0232828 A1 | 8/2016 | Zhang et al. | |
| 2016/0307542 A1 | 10/2016 | Zheng et al. | |
| 2017/0108375 A1* | 4/2017 | Brueck | G01J 1/06 |
| 2017/0117336 A1 | 4/2017 | Rappoport et al. | |
| 2017/0211971 A1 | 7/2017 | Tanaka et al. | |
| 2017/0229059 A1 | 8/2017 | Bonnier et al. | |
| 2017/0289488 A1* | 10/2017 | Hartwell | H04M 1/0264 |
| 2018/0364095 A1* | 12/2018 | Nagaya | G01J 1/0488 |

FOREIGN PATENT DOCUMENTS

| | | |
|---|---|---|
| CN | 204155594 U | 2/2015 |
| CN | 205067323 U | 3/2016 |
| CN | 106461833 A | 2/2017 |
| CN | 107044957 A | 8/2017 |
| DE | 102012001070 A1 | 7/2012 |
| JP | 2004312620 A | 11/2004 |
| WO | 2012071674 A1 | 6/2012 |
| WO | 2017075005 A1 | 5/2017 |

\* cited by examiner

ELECTRONIC DEVICES WITH AMBIENT LIGHT SENSORS

FIELD

This relates generally to electronic devices, and, more particularly, to electronic devices with optical components such as ambient light sensors.

BACKGROUND

Electronic devices such as laptop computers, cellular telephones, and other equipment are sometimes provided with optical components. For example, an electronic device may have an ambient light sensor, an optical proximity sensor, image sensors, and light sources.

The desire to include multiple optical components in an electronic device can pose challenges. It can be difficult to incorporate optical components into an electronic device where space is at a premium. There is also a potential for different optical components to interfere with each other during operation.

SUMMARY

An electronic device may be provided with a display mounted in a housing. The display may have an active area with an array of pixels for forming images and may have an inactive area along one or more edges of the active area. Optical component windows may be formed in the inactive area and other portions of the electronic device. Optical components such as light-emitting diodes, image sensors, optical proximity sensors, and ambient light sensors may be aligned with the optical component windows.

An ambient light sensor may have a light detector integrated circuit with photodetectors. To provide the ambient light sensor with color sensing capabilities, the photodetectors may each be provided with a respective color filter configured to pass a different range of wavelengths.

A diffuser may be used to diffuse incoming ambient light. Infrared light-blocking filter layers may be use to block infrared light such as infrared light emitted by an infrared light-emitting diode in the electronic device and other stray infrared light.

A light guide may be used to route ambient light to the light detector integrated circuit. The light guide may be interposed between a light diffuser and an infrared-blocking filter.

Operation of an ambient light sensor may be coordinated with an infrared light-emitting component such as an infrared light-emitting diode used to provide infrared light illumination for an infrared image sensor.

DETAILED DESCRIPTION

Figure 1:
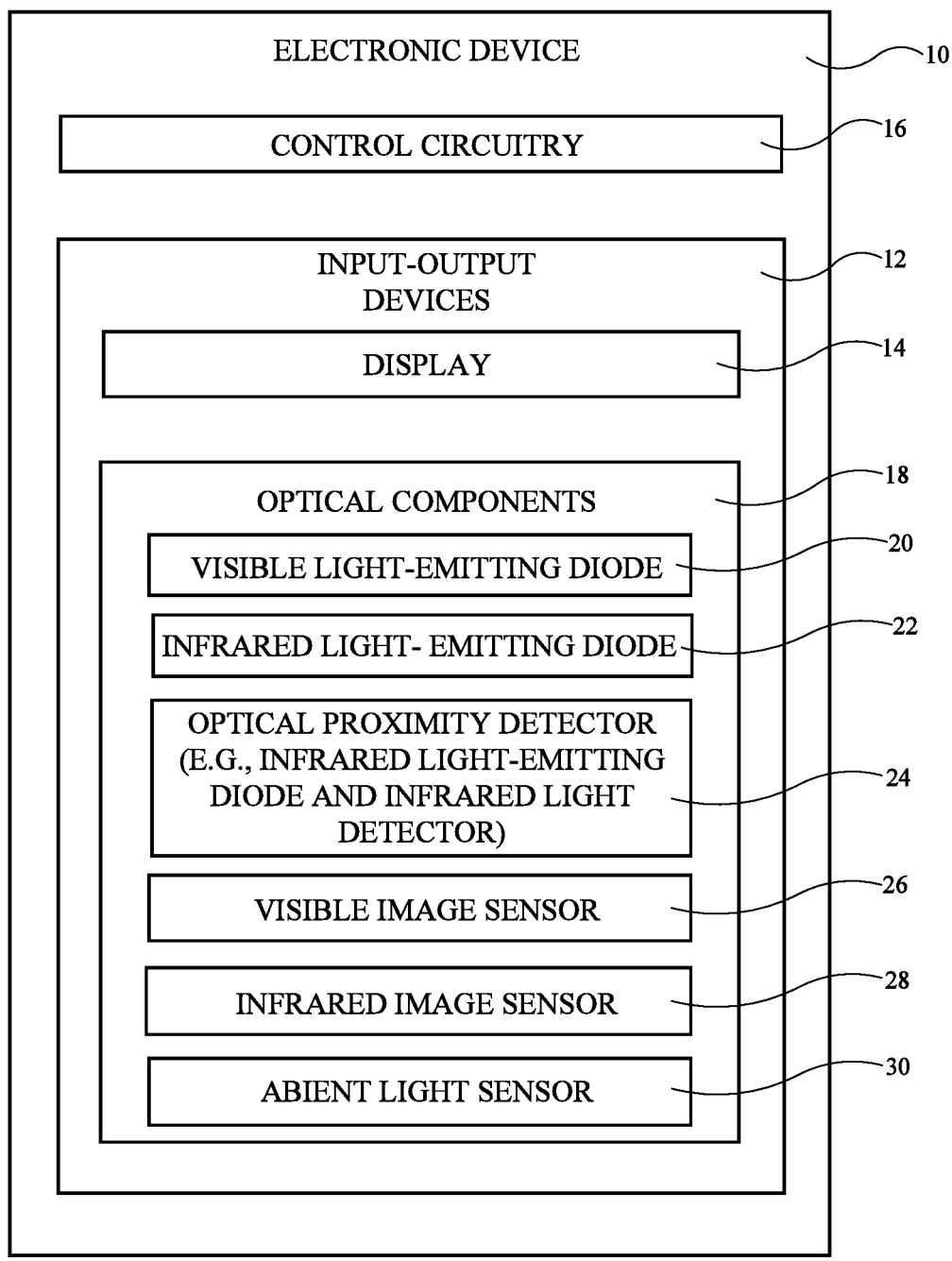
FIG. 1 is a schematic diagram of an illustrative electronic device having optical components in accordance with an embodiment.

An illustrative electronic device of the type that may be provided with optical components such as ambient light sensors is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Device 10 may have input-output circuitry such as input-output devices 12. Input-output devices 12 may include user input devices that gather user input and output components that provide a user with output. Devices 12 may also include communications circuitry that receives data for device 10 and that supplies data from device 10 to external devices. Devices 12 may also include sensors that gather information from the environment.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. Display 14 may be a liquid crystal display, a light-emitting diode display (e.g., an organic light-emitting diode display), an electrophoretic display, or other display.

Input-output devices 12 may include optical components 18. Optical components 18 may include light-emitting diodes and other light sources. As an example, optical components 18 may include one or more visible light-emitting diodes such as light-emitting diode 20. Light-emitting diode 20 may provide constant illumination (e.g., to implement a flashlight function for device 10) and/or may emit pulses of flash illumination for a visible light camera such as visible light image sensor 26. Optical components 18 may also include an infrared light source (e.g., a laser, lamp, light-emitting diode, etc.) such as infrared light-emitting diode 22. Infrared light-emitting diode 22 may provide constant and/or pulsed illumination at an infrared wavelength such as 940 nm, a wavelength in the range of 800-1100 nm, etc. For example, infrared-light-emitting diode 22 may provide constant illumination for an infrared camera such as infrared image sensor 28. Infrared image sensor 28 may, as an example, be configured to capture iris scan information from the eyes of a user and/or may be used to capture images for a facial recognition process implemented on control circuitry 16.

Optical components 18 may also include optical proximity detector 24 and ambient light sensor 30.

Optical proximity detector 24 may include an infrared light source such as an infrared light-emitting diode and a corresponding light detector such as an infrared photodetector for detecting when an external object that is illuminated by infrared light from the light-emitting diode is in the vicinity of device 10.

Ambient light sensor 30 may be a monochrome ambient light sensor that measures the intensity of ambient light or may be a color ambient light sensor that measures ambient light color and intensity by making light measurements with multiple photodetectors each of which is provided with a corresponding color filter (e.g., a corresponding bandpass filter that passes red light, blue light, yellow light, green light, or light of other colors) and each of which therefore responds to ambient light in a different wavelength band.

In addition to optical components 18, input-output devices 12 may include buttons, joysticks, scrolling wheels, touch pads, key pads, keyboards, microphones, speakers, tone generators, vibrators, cameras, light-emitting diodes and other status indicators, non-optical sensors (e.g., temperature sensors, microphones, capacitive touch sensors, force sensors, gas sensors, pressure sensors, sensors that monitor device orientation and motion such as inertial measurement units formed from accelerometers, compasses, and/or gyroscopes), data ports, etc. A user can control the operation of device 10 by supplying commands through input-output devices 12 and may receive status information and other output from device 10 using the output resources of input-output devices 12.

Figure 2:
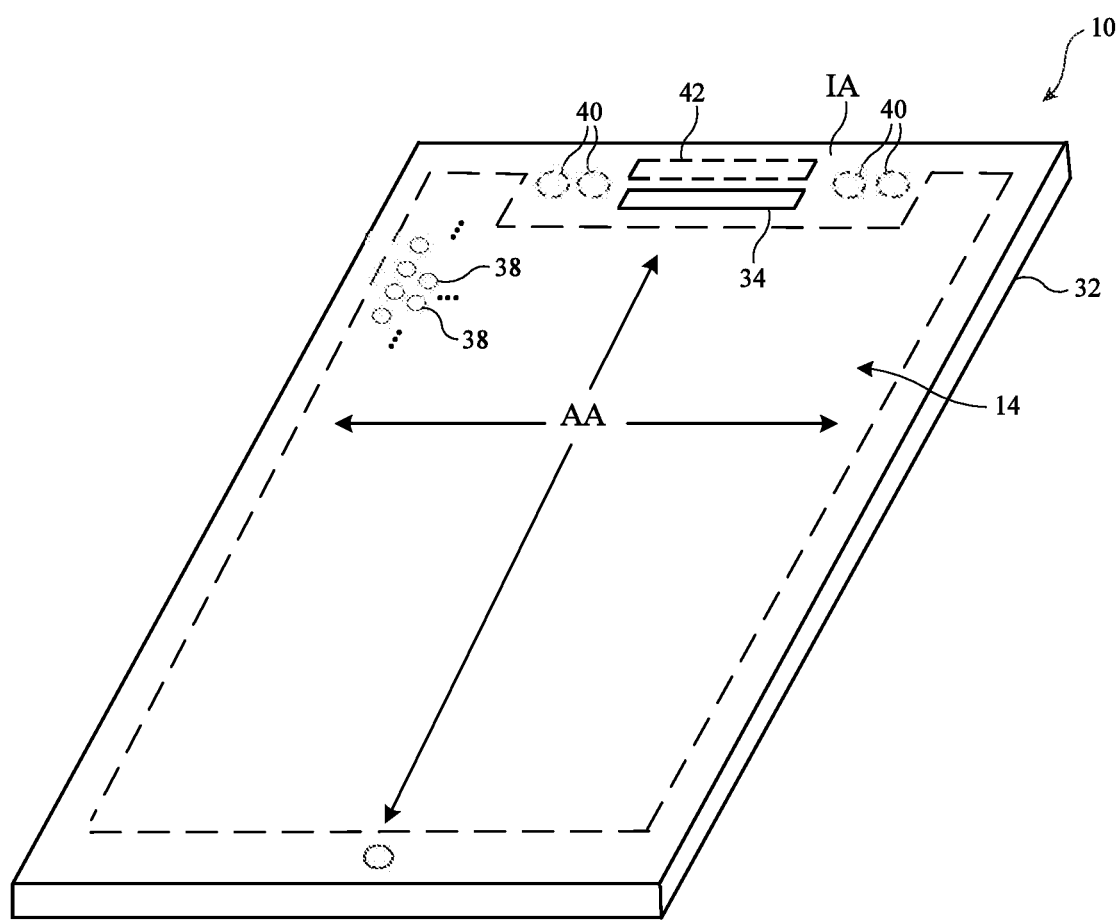
FIG. 2 is a perspective view of an illustrative electronic device with a display having optical component windows overlapping optical components in accordance with an embodiment.

Device 10 may have a housing. The housing may form a laptop computer enclosure, an enclosure for a wristwatch, a cellular telephone enclosure, a tablet computer enclosure, or other suitable device enclosure. A perspective view of a portion of an illustrative electronic device is shown in FIG. 2. In the example of FIG. 2, device 10 includes a display such as display 14 mounted in housing 32. Housing 32, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 32 may be formed using a unibody configuration in which some or all of housing 32 is machined or molded as a single structure or may be formed using multiple structures (e.g., an internal frame structure, one or more structures that form exterior housing surfaces, etc.). Housing 32 may have any suitable shape. In the example of FIG. 2, housing 32 has a rectangular outline (footprint when viewed from above) and has four peripheral edges (e.g., opposing upper and lower edges and opposing left and right edges). Sidewalls may run along the periphery of housing 32.

Display 14 may be protected using a display cover layer such as a layer of transparent glass, clear plastic, sapphire, or other clear layer (e.g., a transparent planar member that forms some or all of a front face of device 10 or that is mounted in other portions of device 10). Openings may be formed in the display cover layer. For example, an opening may be formed in the display cover layer to accommodate a button, a speaker port such as speaker port 34, or other components. Openings may be formed in housing 32 to form communications ports (e.g., an audio jack port, a digital data port, etc.), to form openings for buttons, etc. In some configurations, housing 32 may have a rear housing wall formed from a planar glass member or other transparent layer (e.g., a planar member formed on a rear face of device 10 opposing a front face of device 10 that includes a display cover layer).

Display 14 may have an array of pixels 38 in active area AA (e.g., liquid crystal display pixels, organic light-emitting diode pixels, electrophoretic display pixels, etc.). Pixels 38 of active area AA may display images for a user of device 10. Active area AA may be rectangular, may have notches along one or more of its edges, may be circular, may be oval, may be rectangular with rounded corners, and/or may have other suitable shapes.

Inactive portions of display 14 such as inactive border area IA may be formed along one or more edges of active area AA. Inactive border area IA may overlap circuits, signal lines, and other structures that do not emit light for forming images. To hide inactive circuitry and other components in border area IA from view by a user of device 10, the underside of the outermost layer of display 14 (e.g., the display cover layer or other display layer) may be coated with an opaque masking material such as a layer of black ink (e.g., polymer containing black dye and/or black pigment, opaque materials of other colors, etc.) and/or other layers (e.g., metal, dielectric, semiconductor, etc.). Opaque masking materials such as these may also be formed on an inner surface of a planar rear housing wall formed from glass, ceramic, polymer, crystalline transparent materials such as sapphire, or other transparent material.

In the example of FIG. 2, speaker port 34 is formed from an elongated opening (e.g., a strip-shaped opening) that extends along a dimension parallel to the upper peripheral edge of housing 32. A speaker may be mounted within device housing 32 in alignment with the opening for speaker port 34. During operation of device 10, speaker port 34 serves as an ear speaker port for a user of device 10 (e.g., a user may place opening 34 adjacent to the user's ear during telephone calls).

Optical components 18 (e.g., a visible digital image sensor, an infrared digital image sensor, a light-based proximity sensor, an ambient light sensor, visible and/or infrared light-emitting diodes that provide constant and/or pulsed illumination, etc.) may be mounted under one or more optical component windows such as optical component windows 40 and 42. In the example of FIG. 2, windows 40 have circular outlines (e.g., circular footprints when viewed from above) and window 42 has an elongated strip-shaped opening (e.g., an elongated strip-shaped footprint when viewed from above). Window 42 is mounted between the sidewall along the upper peripheral edge of device 10 and speaker port 34 and extends parallel to the upper peripheral edge of housing 32. If desired, windows such as optical windows 40 and 42 may have shapes other than circular and rectangular shapes. The examples of FIG. 2 are merely illustrative.

Optical component windows such as windows 40 and 42 may be formed in inactive area IA of display 14 (e.g., an inactive border area in a display cover layer such as an inactive display region extending along the upper peripheral edge of housing 32) or may be formed in other portions of device 10 such as portions of a rear housing wall formed from a transparent member coated with opaque masking material, portions of a metal housing wall, polymer wall structures, etc. In the example of FIG. 2, windows 40 and 42 are formed adjacent to the upper peripheral edge of housing 32 between speaker port opening 34 in the display cover layer for display 14 and the sidewall along the upper edge of housing 32. In some configurations, an opaque masking layer is formed on the underside of the display cover layer in inactive area IA and optical windows 40 and 42 are formed from openings within the opaque masking layer. To help optical windows 40 and 42 visually blend with the opaque masking layer, a dark ink layer, a metal layer, a thin-film interference filter formed from a stack of dielectric layers, and/or other structures may be overlap windows 40 and 42.

Figure 3:
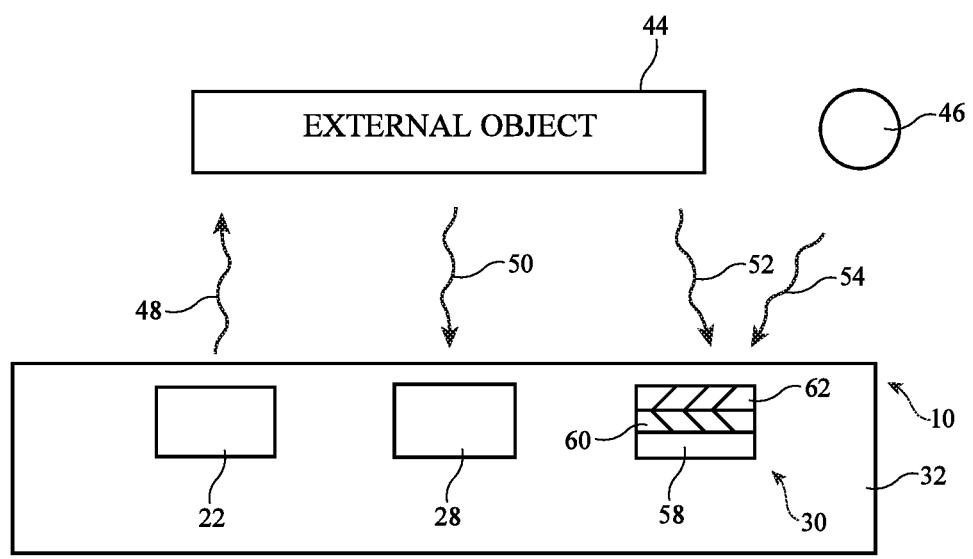
FIG. 3 is a cross-sectional side view of an illustrative electronic device that has optical components such as a light source, image sensor, and ambient light sensor in accordance with an embodiment.

In some modes of operation, device 10 may emit infrared light that has the potential to interfere with ambient light sensor operation. Consider, as an example, a scenario in which control circuitry 16 of device 10 is using infrared image sensor 28 to capture eye scan information and/or facial images (e.g., images of a user's face for use in performing face recognition operations to authenticate the user of device 10). As shown in FIG. 3, to ensure that the eyes and/or face of a user are sufficiently illuminated, device 10 may use infrared light source 22 (e.g., an infrared light-emitting diode, an infrared laser, etc.) to produce infrared light 48. Light 48 may illuminate external objects in the vicinity of device 10 such as external object 44 (e.g., a user's face and/or eyes). Reflected infrared light 50 from external object 44 may be received and imaged using infrared digital image sensor 28 to produce infrared images of the face and/or eyes.

While reflected infrared light 50 is being imaged, stray infrared light reflected from object 44 such as stray infrared light 52 may be present at ambient light sensor 30. To ensure that stray infrared light 52 does not interfere with the ambient light measurements being made with ambient light sensor 30, ambient light sensor 30 may have an infrared blocking filter such as filter 60. Filter 60 may be formed from materials that are transparent to visible light and that block infrared light such as blue glass (e.g., blue borosilicate glass or other infrared-light-blocking glass) and/or from thin-film interference filters formed from stacks of dielectric layers configured to block infrared light (e.g., infrared light at the wavelengths associated with stray light 52 and, if desired, additional infrared wavelengths) while passing visible light.

Ambient light 54 may be present in the surroundings of device 10 and may include light emitted from a light source such as light source 46 (e.g., the sun, a lamp, etc.). In some situations, ambient light 54 may be directional (e.g., the rays of light 54 from light source 46 may be aligned in a particular direction due to the nature of light source 46). To ensure that the response of ambient light detector 30 is even over a range of different orientations relative to light source 46 and ambient light 54, a light diffuser such as diffuser 62 may be incorporated into ambient light sensor 30. Ambient light sensor 30 may have one or more photodetectors (e.g., photodiodes) and associated amplifier and digitizing circuitry implemented on light detector integrated circuit 58. Diffuser 62 may overlap visible-light-transmitting-and-infrared-light-blocking filter layer 60 and integrated circuit 58.

Figure 4:
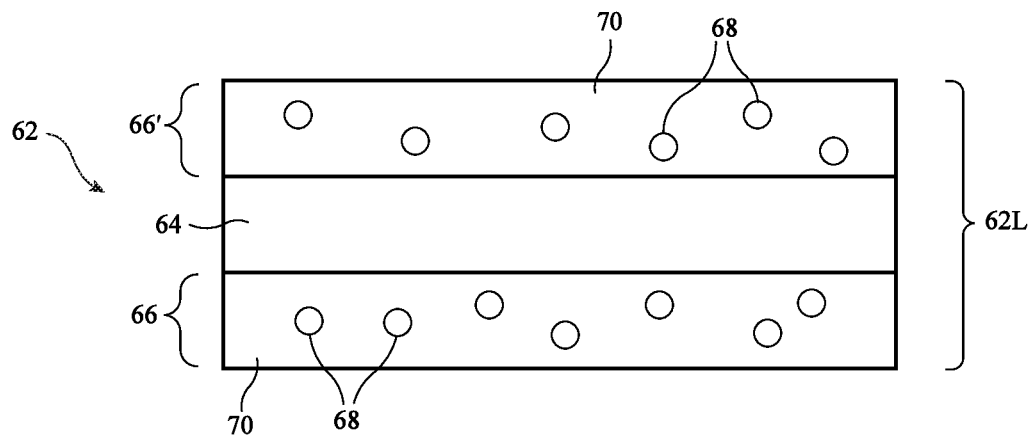
FIG. 4 is a cross-sectional side view of an illustrative diffuser in accordance with an embodiment.

Diffuser 62 may be formed from polymer, glass, or other suitable materials. Diffuser 62 may be formed from one or more diffuser layers such as illustrative diffuser 62L of FIG. 4. If desired, each diffuser layer 62L may have a substrate such as substrate 64. Substrate 64 may be formed from clear glass, transparent polymer, or other suitable substrate material. Diffuser coatings such as lower coating layer 66 and upper coating layer 66' may be formed on both sides of substrate 64, on only the upper side of substrate 64 (see, e.g., coating layer 66'), or on only the lower side of substrate 64 (see, e.g., coating layer 66). Coating layers 66 and 66' may include polymer (e.g., clear binder such as a transparent polymer resin) such as polymer 70 and may include light-scattering particles 68 embedded in polymer 70. Light-scattering particles 68 may be titanium oxide particles or other particles with a refractive index that is larger (or smaller) than the refractive index of polymer 70. If desired, light-scattering particles 68 may be incorporated into substrate 64. Light-scattering coatings formed from polymer with embedded light-scattering particles may also be formed on a display cover layer, light guide structures, filter layers, and/or other transparent materials in device 10. If desired, light-scattering features such as protrusions and/or recesses may also be included in one or more of the layers of material forming diffuser 62. With one illustrative configuration, diffuser 62 may include a pair of diffuser layers 62L (e.g., first and second diffusers 62 that are stacked above light detector integrated circuit 58 (FIG. 3). In general, any suitable number of diffuser layers 62L may be included in diffuser 62 (e.g., one, at least two, at least three, etc.).

Figure 5:
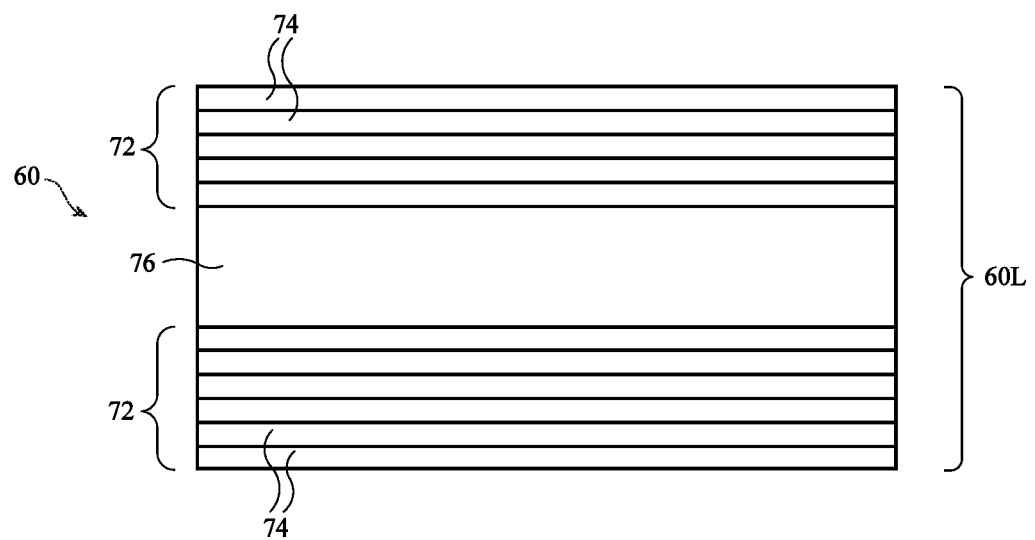
FIG. 5 is a cross-sectional side view of an illustrative thin-film interference filter in accordance with an embodiment.

Visible-light-transmitting-and-infrared-light-blocking filter 60 (sometimes referred to as an infrared-light-blocking filter, infrared-blocking filter, etc.) may be formed from one or more layers such as infrared-light-blocking layer 60L of FIG. 5. As shown in FIG. 5, layer 60L may include a substrate such as substrate 76. Substrate 76 may be a polymer or glass layer that is transparent at visible wavelengths. Substrate 76 may be transparent at infrared wavelengths or may block infrared light. Thin-film interference filters 72 that are configured to transmit visible light and block infrared light may be formed on the upper and/or lower surfaces of substrate 76. Filters 72 may each include a dielectric stack of thin-film dielectric layers 74 such as inorganic dielectric layers with alternating higher and lower refractive index values. Layers 74 may, for example, be formed from inorganic dielectric materials such as silicon oxide, silicon nitride, niobium oxide, tantalum oxide, titanium oxide, aluminum oxide, etc., and/or may be formed from organic dielectric materials. There may be any suitable number of layers 74 in each dielectric stack (e.g., at least 5, at least 10, at least 30, at least 40, 20-90, fewer than 100, etc.).

In general, sensor 30 may include one or more infrared blocking filters such as filter 60 and each filter 60 may include one or more infrared blocking layers 60L. Each layer 60L may include one or more dielectric stacks 72 of thin-film layers 74. If desired, thin-film infrared-light-blocking filters may be implemented from dielectric stacks formed on a display cover layer, a light guide layer, a lens, a diffuser, an integrated circuit, and/or other structures in ambient light sensor 30 through which ambient light passes.

Figure 6:
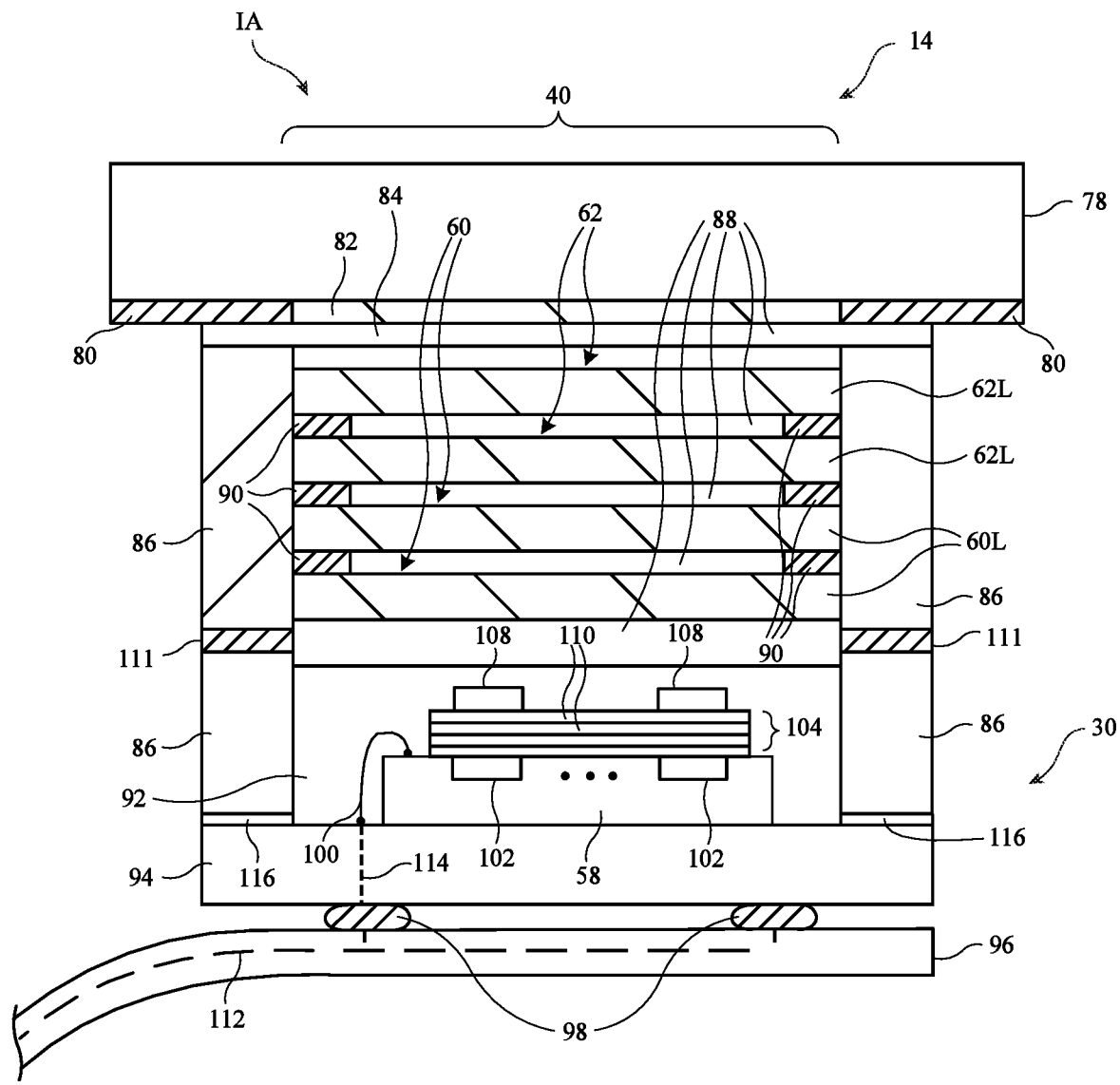
FIG. 6 is a cross-sectional side view of an illustrative ambient light sensor in accordance with an embodiment.

FIG. 6 shows an illustrative configuration for a color ambient light sensor in device 10. In the example of FIG. 6, color ambient light sensor 30 is formed in alignment with optical component window 40 (sometimes referred to as an ambient light sensor window) in display 14. Display 14 has an array of pixels overlapped by display cover layer 78 in an active area (AA) of display 14 (not shown in FIG. 6). In inactive area IA, portions of the underside of display cover layer 78 may be coated with a layer of opaque masking material 80 (e.g., black ink, etc.) to block internal components from view from the exterior of device 10. Window 40 may be formed from an opening in the opaque masking material 80. In window 40, a thin layer of black ink 82 or other material that is at least partially transparent to visible light (e.g., a layer with a light transmission of at least 1%, at least 2%, at least 5%, 1-10%, less than 30%, etc.) may be present to help visually match the appearance of window 40 to the visual appearance of surrounding portions of display cover layer 78 (e.g., to match the appearance of opaque masking material 80) while still allowing ambient light sensor 30 to measure ambient light.

Color ambient light sensor 30 may include support structures such as support structure 86 (sometimes referred to as a sensor wall, a sensor body structure, a sensor housing structure, etc.). Clear adhesive such as a layer of pressure sensitive adhesive 84 may be used to couple support structure 86 to the underside of display cover layer 78 in alignment with optical component window 40. Support structure 86 may form walls that surround light diffuser 62, infrared-light-blocking filter 60, and light detector integrated circuit 58. Viewed from above through layer 78, support structure 86 may extend around the periphery of optical window 40. Support structure 86 may be formed from an opaque material that blocks visible and infrared light such as black plastic and/or other opaque materials. Support structure 86 may be used to form a one-piece or a multi-piece housing for sensor 30. In the example of FIG. 6, support structure 86 has an upper portion that houses components such as light diffuser 62 and infrared-light-blocking filter 60 and has a lower portion that houses light detector integrated circuit 58. The upper and lower portions may be joined using pressure sensitive adhesive 111 or other suitable attachment mechanism.

Diffuser 62 of FIG. 6 has an upper diffuser layer 62L and a lower diffuser layer 62L. In the upper diffuser layer, substrate 64 (FIG. 4) may be coated with upper diffuser coating 66' and may not have any lower diffuser coating. In the lower diffuser layer, substrate 64 may be coated with lower diffuser coating 66 and coating 66' may be omitted. Air gaps 88 may separate diffuser layers 62L from each other and from adjacent layers in ambient light sensor 30 (e.g., to enhance the amount of space available for light mixing).

Infrared-light-blocking filter 60 may be formed from upper and lower infrared light-blocking layers 60L. Each layer may include a substrate and a thin-film filter dielectric stack on one or both sides of the substrate configured to block infrared light while passing visible light.

Pressure sensitive adhesive rings 90 may separate layers 62L and 60L from each other. Pressure sensitive adhesive ring 116 may be used to couple printed circuit 94 to support structures 86.

Light detector integrated circuit 58 may be formed from a silicon die or other semiconductor die. Wire bonds 100 may be used to couple wire bond pads on integrated circuit 58 to wire bond pad on printed circuit 94. Solder joints 98 may be used to couple signal paths formed from metal traces 112 in flexible printed circuit 96 to signal paths 114 in printed circuit 94 (e.g., signal paths formed from metal lines in printed circuit 94 that are coupled to wire bonds 100). In this way, the circuitry of light detector integrated circuit 58 is coupled to the signal paths in flexible printed circuit 96 (e.g., so that these signal paths may route signals to and from control circuitry 16). If desired, light detector integrated circuit 58 of FIG. 6 may be provided with through-silicon vias to electrically couple circuitry in integrated circuit 58 to printed circuit 94 without using bond wires.

Light detector integrated circuit 58 may include multiple photodetectors 102 (e.g., photodiodes). Each photodetector 102 may be overlapped by a respective color filter 108. Each color filter may be formed from colored ink or other material that selectively passes a desired range of wavelengths to an associated overlapped photodetector 102 (e.g., an organic color filter material such as polymer containing dyes and/or pigments). For example, a red-pass color filter may overlap a first photodetector 102 to form a red-light-sensing channel in ambient light sensor 30, a blue-pass color filter may overlap a second photodetector 102 to form a blue-light-sensing channel in ambient light sensor 30, etc. Stray infrared light may be blocked using a thin-film interference filter such as filter 104 formed from a stack of dielectric layers (e.g., alternating higher and lower refractive index thin-film inorganic layers). Filter 104 may, for example, have a configuration of the type described in connection with dielectric stack 72 of FIG. 5. Filter 104 may be formed from any suitable number of dielectric layers 100 (e.g., at least 5, at least 10, at least 20, 20-80, fewer than 100, etc.). Layers 100 may be formed on the upper surface of light detector integrated circuit 58 overlapping each of photodetectors 102 and interposed between color filters 108 and photodetectors 102. Encapsulant 92 (e.g., a clear polymer such as epoxy) may be used to protect the silicon integrated circuit die that forms integrated circuit 58 from environmental contamination.

Figure 7:
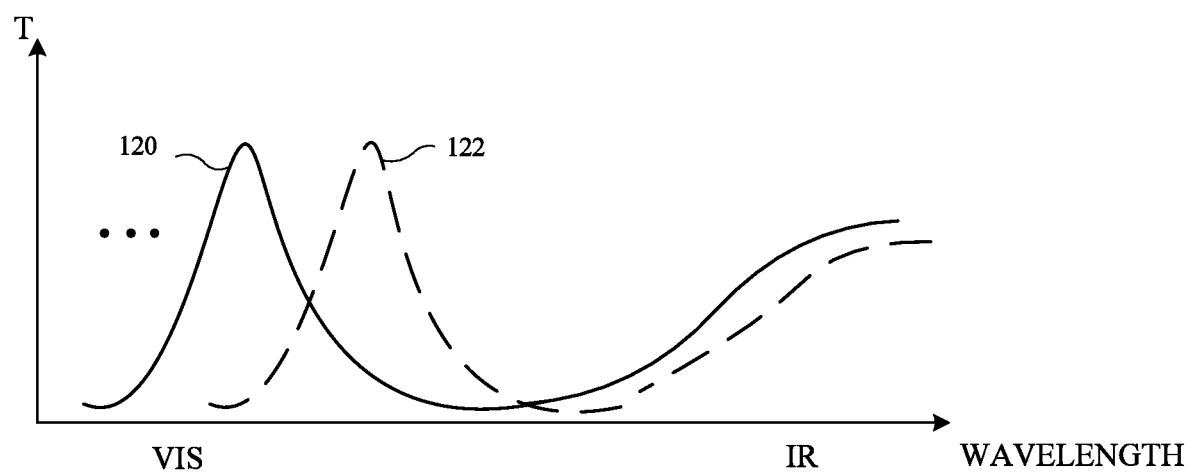
FIG. 7 is a graph showing how light transmission may vary as a function of wavelength for illustrative organic ambient light sensor color filters in accordance with an embodiment.
Figure 8:
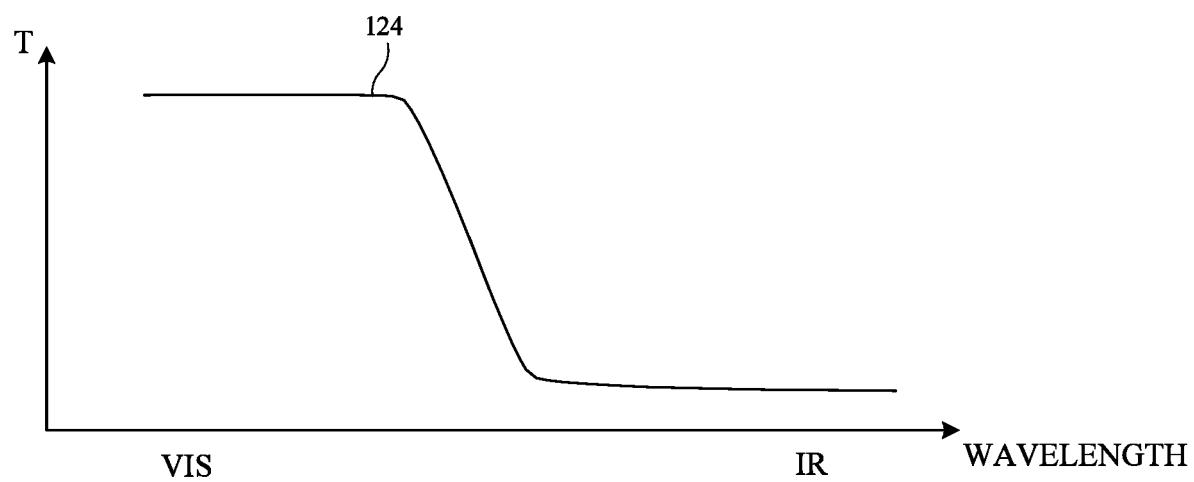
FIG. 8 is a graph showing how light transmission may vary as a function of wavelength for a thin-film infrared-light-blocking filter in accordance with an embodiment.

Light transmission curves 120 and 122 of FIG. 7 represent illustrative light transmission characteristics (band-pass characteristics) for color filters 108. Curve 120 may, as an example, be associated with a blue color filter and may cover a range of blue wavelengths, whereas curve 122 may be associated with a green color filter and may cover green wavelengths (as an example). As shown in FIG. 7, dye and/or pigment based color filters formed from organic materials (e.g., polymer colored with dye and/or pigment) may be transparent at infrared wavelengths. To ensure that stray infrared light that passes through color filters 108 does not reach photodetectors 102, visible-light-transmitting-and-infrared-light blocking layer (filter) 104 may have a light transmission characteristic of the type shown by curve 124 of FIG. 8 that blocks infrared light. Configurations may also be used for ambient light sensor 30 in which the color filter for each channel in color ambient light sensor 30 of FIG. 6 is formed from a thin-film interference filter configured to serve as a bandpass filter for a range of wavelengths associated with that channel.

Figure 9:
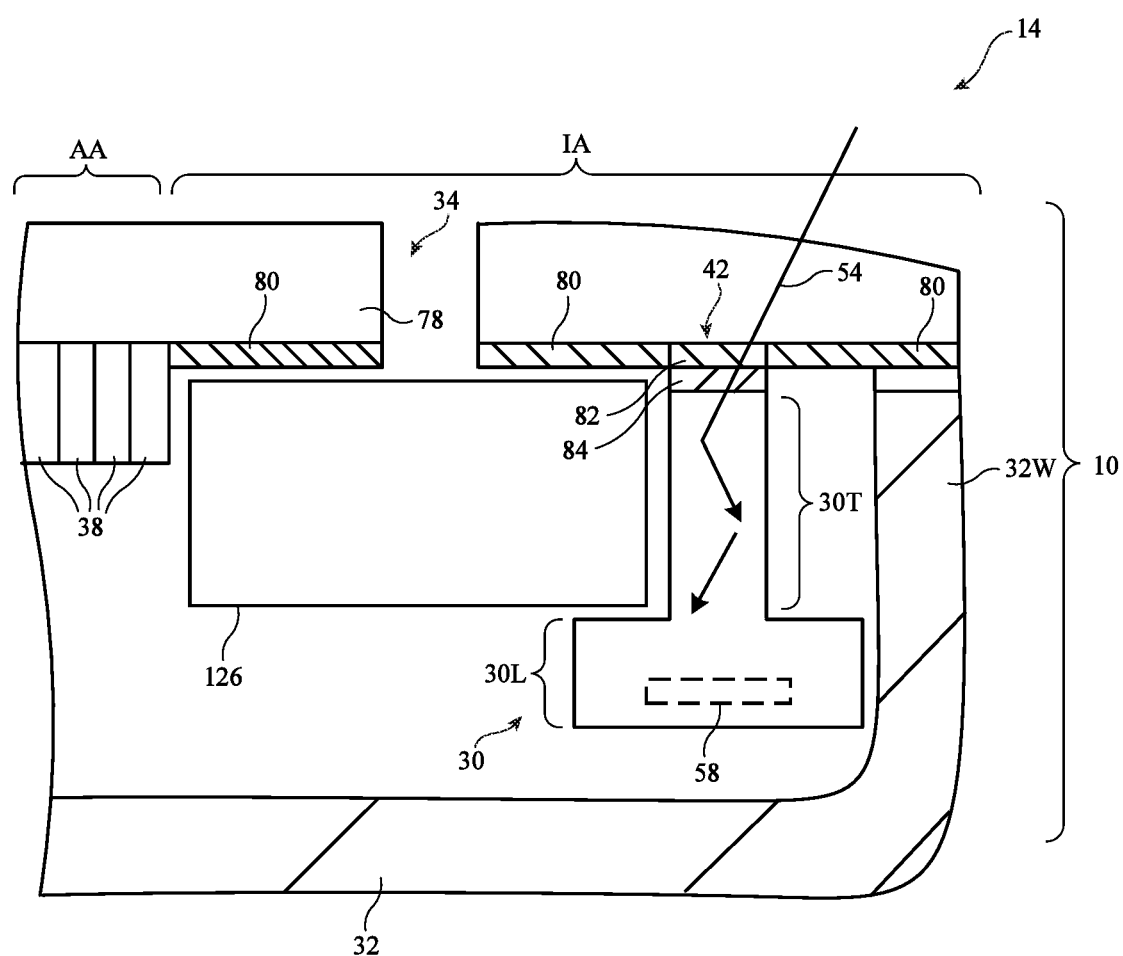
FIG. 9 is a cross-sectional side view of an illustrative electronic device having an ambient light sensor with a light guide in accordance with an embodiment.

If desired, an ambient light sensor may include a light guide. The light guide may help route incoming ambient light to light detector integrated circuit 58 past an electrical component such as a speaker. Consider, as an example, the arrangement shown in FIG. 9. FIG. 9 is a cross-sectional side view of the upper edge portion of device 10 of FIG. 2. As shown in FIG. 9, display cover layer 78 may overlap an array of pixels 38 for display 14 in active area AA. In inactive area IA, speaker 126 may be mounted in alignment with speaker port 34 in display cover layer 78. Speaker 126 may be relatively wide and the amount of space between speaker 126 and the adjacent sidewall of housing 32 (e.g., the topmost peripheral edge of housing 32 in FIG. 2) may accordingly be relatively small. This constrains the amount of lateral space available for accommodating color ambient light sensor 30 near display cover layer 78.

Color ambient light sensor 30 may have a lower portion such as portion 30L that is relatively wide to house light detector integrated circuit 58 and may have a narrower upper portion such as portion 30T that contains a light guide and that can therefore be accommodated in the relatively narrow space between speaker 126 and sidewall 32W of housing 32. The light guide in portion 30T is interposed between speaker 126 and housing sidewall 32SW along the upper peripheral edge of housing 32. To help provide incoming ambient light 54 to the photodetectors in light detector integrated circuit 58 in the limited space available between speaker port 34 and housing sidewall 32SW of housing 32, the light guide of ambient light sensor portion 30T may be configured to guide incoming light 54 from optical component window 34 to photodetectors on light detector integrated circuit 58 past speaker 126.

Figure 10:
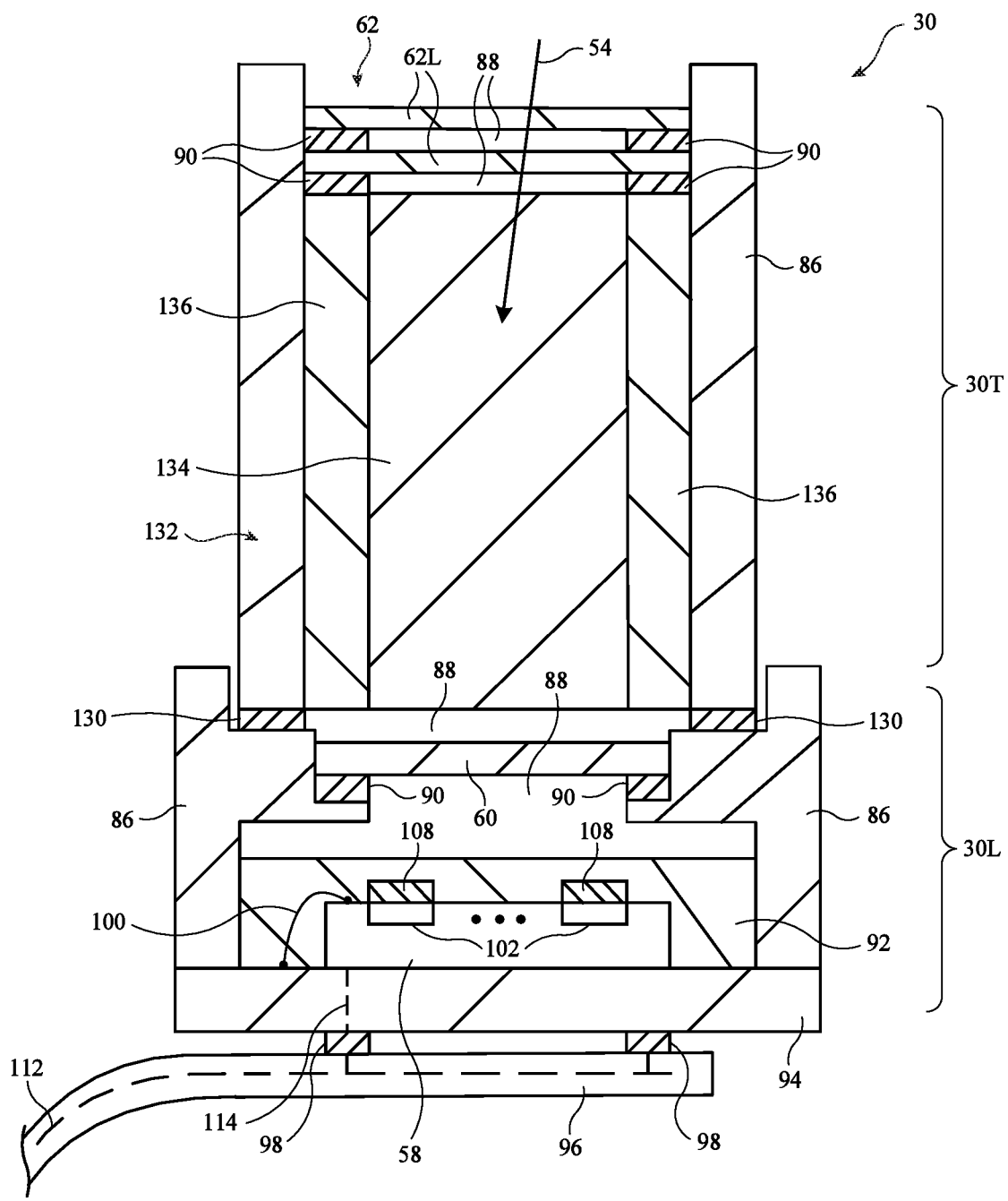
FIG. 10 is a cross-sectional side view of an illustrative ambient light sensor with a light guide in accordance with an embodiment.

FIG. 10 is a cross-sectional side view of an illustrative color ambient light sensor with a light guide of the type shown in FIG. 9. As shown in FIG. 10, color ambient light sensor 30 may include support structure 86 (sometimes referred to as an ambient light sensor housing structure, housing, body, etc.). Support structure 86 may be formed from an opaque material such as black polymer. An upper portion of support structure 86 in portion 30T of sensor 30 may be coupled to a lower portion of support structure 86 in portion 30L of sensor 30 using pressure sensitive adhesive 130.

Light guide 132, which may sometimes be referred to as a light pipe, waveguide, or light guide structure, may have a core such as core 134 and a cladding such as cladding 136 that surrounds core 134. Core 134 may have a higher index of refraction than cladding 136 to promote total internal reflection and guiding of ambient light 54 within light guide 132. For example, core 134 may have an index of refraction of 1.5-2.0 and cladding 136 may have an index of refraction of 1.1-1.5 (as examples). Core 134 and cladding 136 may be formed from glass, polymer, sapphire or other transparent crystalline material, or other transparent material. As an example, core 134 may be formed from glass and cladding 136 may be formed from a polymer having a lower index of refraction than the glass of core 134. Configurations in which cladding 136 is omitted and in which core 134 is surrounded by an air gap to ensure that light is guided within core 134 in accordance with the principal of total internal reflection may also be used, if desired. In arrangements in which cladding 136 is present, dust and other contaminants that might otherwise contact the outer surface of core 134 can be prevented from contacting core 134. This can improve the reliability of light guide 132. The presence of cladding 136 may also help support light guide 132 within support structure 86 and may thereby help enhance the ability of light guide 132 to withstand damage during a drop event.

Diffuser 62 may diffuse incoming ambient light 54 and may be located between the upper surface of light guide 132 and the lower surface of display cover layer 78 (FIG. 9). After propagating through light guide 132, ambient light 54 may pass through visible-light-transmitting-and-infrared-light blocking filter 60. Filter 60 may be mounted in a recessed portion of support structure 86 in lower portion 30L and may be coupled to support structure 86 using a ring of pressure sensitive adhesive 90. Rings of pressure sensitive adhesive 90 may also separate diffuser layers 62L from each other and from light guide 132 to form air gaps 88. Filter 60 may have a substrate such as substrate 76 of FIG. 5 (e.g., an infrared-light-blocking glass layer such as a blue borosilicate glass layer or other glass layer that prevents passage of infrared light) and may have upper and lower dielectric stacks 72 on the glass layer that are formed from thin-film inorganic dielectric layers or other dielectric layers 74 with alternating higher and lower refractive index values. Stacks 72 form a thin-film interference filter that passes visible light while blocking infrared light. Because filter 60 is located close to light detector integrated circuit 58 (e.g., because filter 60 is between light guide 132 and integrated circuit 58), stray infrared light that enters into the interior of support structure 86 (e.g., at locations near adhesive 130) will be blocked and prevented from reaching light detector integrated circuit 58. If desired, infrared filters such as filter 60 may be placed elsewhere in color ambient light sensor 30 such as between diffuser 62 and light guide 132.

Color filters 108 (e.g., band pass filters having pass bands in different wavelength ranges) may be formed over respective photodetectors 102 in integrated circuit 58 to provide ambient light sensor 30 with color light sensitivity. Encapsulant 92 (e.g., one or more layers of clear polymer such as epoxy, etc.) may be used to cover integrated circuit 58. Wire bonds 100, traces 114 in printed circuit 94, solder joints 98, and traces 112 in flexible printed circuit 96 may be used to route signals between control circuitry 16 and integrated circuit 58. If desired, light detector integrated circuit 58 of FIG. 10 may be provided with through-silicon vias to electrically couple circuitry in integrated circuit 58 to printed circuit 94 without using bond wires.

Figure 11:
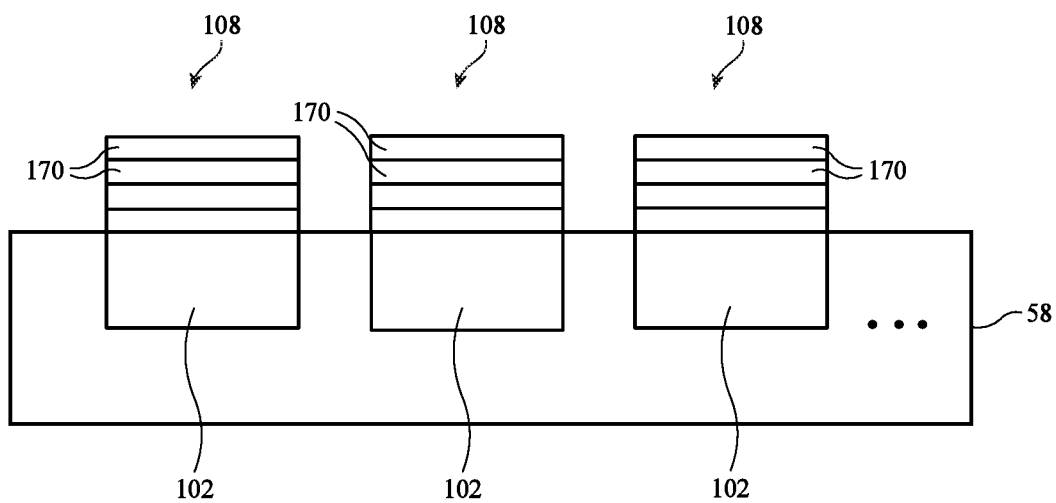
FIG. 11 is a cross-sectional side view of an illustrative ambient light sensor integrated circuit having photodetectors overlapped by color filters formed from thin-film interference filters in accordance with an embodiment.
Figure 12:
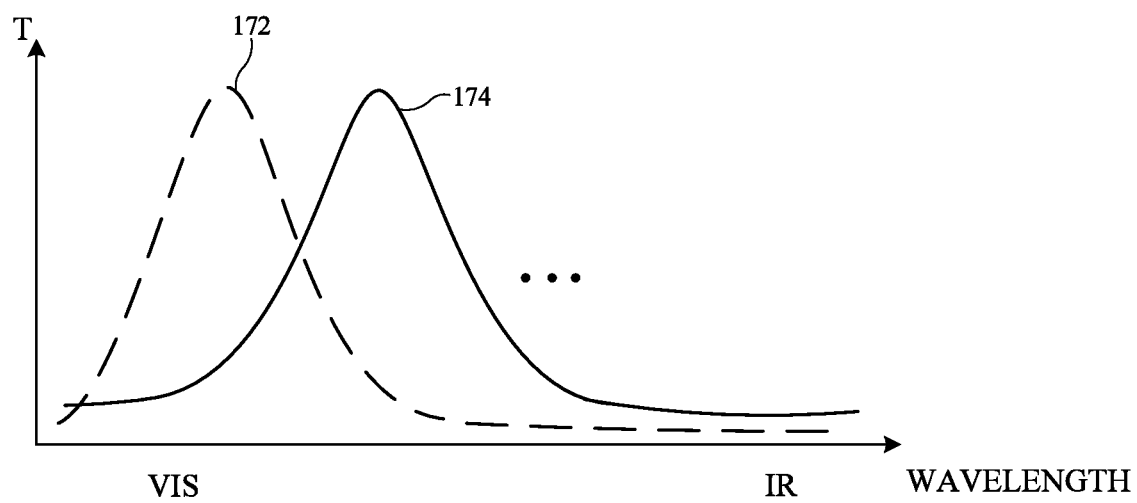
FIG. 12 is a graph in which light transmission has been plotted as a function of wavelength for illustrative color filters such as thin-film interference filters with different pass bands in accordance with an embodiment.

As shown in FIG. 11, color filters 108 of FIG. 10 may be thin-film interference filters. Each color filter 108 for color ambient light sensor 30 of FIG. 10 may, for example, have a stack of 5-100 dielectric layers 170 (e.g., inorganic dielectric layers such as silicon oxide, niobium oxide, aluminum oxide, tantalum oxide, titanium oxide, silicon nitride, etc. and/or organic dielectric layers) with alternating refractive index values to form desired bandpass color filters for respective photodetectors 102 in integrated circuit 58. Transmission versus wavelength characteristics for illustrative color filters 108 of the type shown in FIG. 11 are shown by curves 172 and 174 in FIG. 12. As shown in FIG. 12, the thin-film interference filter structures that are used in forming filters 108 may be configured to block infrared light.

Figure 13:
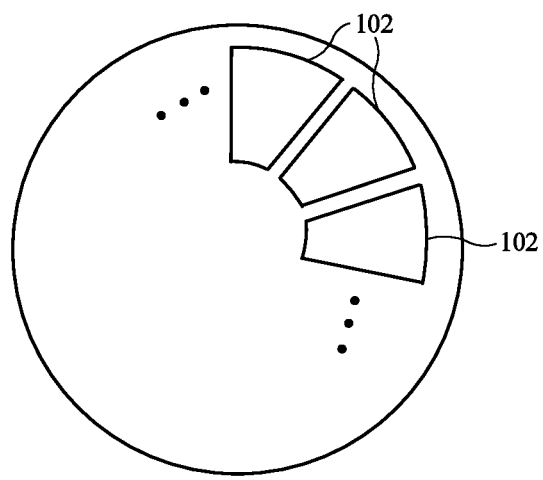
FIG. 13 is a top view of an illustrative ambient light sensor integrated circuit having a set of photodetectors with a circular outline in accordance with an embodiment.
Figure 14:
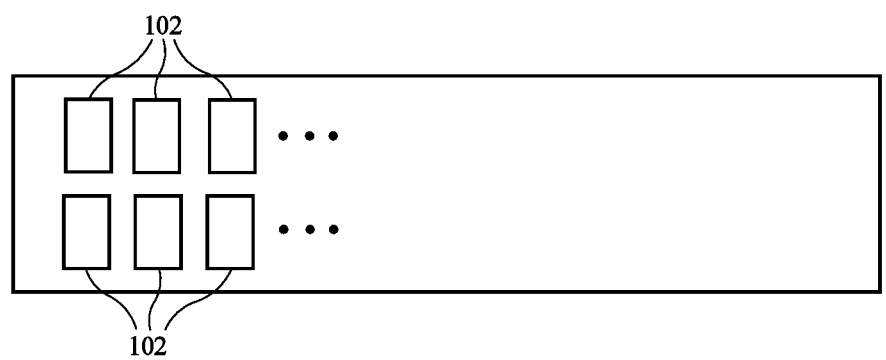
FIG. 14 is top view of an illustrative ambient light sensor having a set of photodetectors with a rectangular outline in accordance with an embodiment.

An illustrative circular photodetector layout for photodetectors 102 of integrated circuit 58 of FIG. 6 is shown in FIG. 13. An illustrative elongated rectangular layout for photodiodes 102 of integrated circuit 58 of FIG. 10 is shown in FIG. 14. Other configurations may be used, if desired. In arrangements of the type shown in FIGS. 13 and 14, photodetectors for different color channels can be distributed throughout sensor 30 and, if desired, redundant photodetectors (e.g., photodetectors measuring the same color of ambient light) may be included in ambient light sensor 30. As an example, photodetectors 102 of FIG. 13 and/or FIG. 14 may include photodetectors for 3-10 different color channels (including an optional clear color channel) and each color channel may have 1-5 different individual photodetectors 102 for gathering ambient light color readings for that color channel. Circuitry in integrated circuit 58 (e.g., switching circuitry, amplifier circuitry, analog-to-digital conversion circuitry, communications circuitry for supporting communications with control circuitry elsewhere in device 10, etc.) may be incorporated into integrated circuit 58 with photodetectors 102 or, if desired, some or all of this supporting circuitry for photodetectors 102 may be formed in one or more integrated circuits that are separate from integrated circuit 58.

Ambient light sensor measurements from ambient light sensor 30 may be used to control the operation of device 10. For example, control circuitry 16 may adjust the intensity of images displayed on display 14 in response to measured changes in the intensity of ambient light. If, as an example, a user moves device 10 to a bright outdoors environment, control circuitry 16 may increase the brightness of display 14 to overcome glare. Color changes (e.g., white point adjustments) can also be made based on ambient light sensor measurements. If, for example, ambient light color measurements indicate that ambient lighting has become warm (e.g., when a user moves device 10 indoors), the white point of display 14 can be adjusted by control circuitry 16 so that display 14 displays corresponding warmer content.

If desired, the gathering of ambient light sensor measurements and the illumination of external objects using light sources such as infrared light-emitting diode 22 may be coordinated. With one illustrative arrangement, ambient light sensor measurements may momentarily be paused whenever light-emitting diode 22 emits a pulse of light. With another illustrative arrangement, a flag may be set whenever light-emitting diode 22 is activated during the gathering of ambient light sensor measurements (e.g., so that these measurements, which may be contaminated by noise from the light from diode 22, may be discarded). In yet another embodiment, potential light contamination from adjacent electronic devices may be detected using a light sensor (e.g., an infrared light sensor). If light from nearby devices is detected, ambient light sensor measurements can be discarded.

Figure 15:
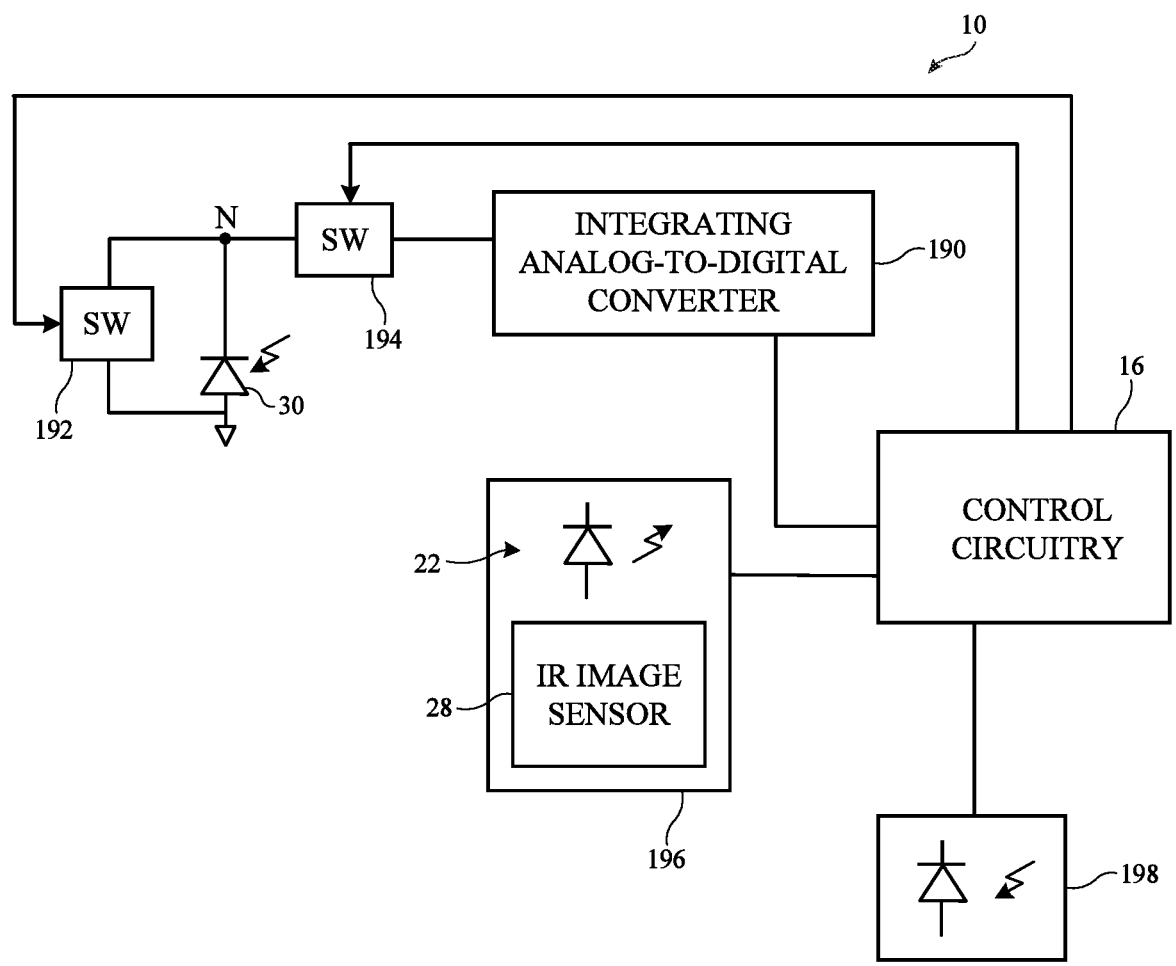
FIG. 15 is a circuit diagram of illustrative circuitry for an electronic device in accordance with an embodiment.

FIG. 15 is a circuit diagram of illustrative circuitry for device 10 that may be used in coordinating the operation of ambient light sensing circuitry and light-emitting circuitry in accordance with an embodiment. As shown in FIG. 15, ambient light sensor 30 may be formed from a photodetector such as a photodiode. The output of photodetector (ambient light sensor) 30 may be provided to integrating analog-to-digital converter 190. During operation, integrating analog-to-digital converter 190 may integrate the photodiode current associated with the photodetector of ambient light sensor 30 and may supply corresponding digital ambient light sensor measurement data to control circuitry 16. The time periods during which ambient light sensor 30 gathers ambient light data can be controlled by control circuitry 16. For example, control circuitry 16 can supply control signals (sometimes referred to as a HOLD signal) to switching circuitry such as switches 192 and 194. When the hold signal is asserted, switch 192 is closed and shorts node N to ground, thereby shunting the photodiode current from the photodiode of ambient light sensor 30 to ground. At the same time, assertion of the hold signal opens switch 194, so that node N is disconnected from the input to integrating analog-to-digital converter 190. When the HOLD signal is deasserted, switch 192 is opened and switch 194 is closed, so that integrating analog-to-digital converter 190 can gather ambient light data.

Control circuitry 16 can also control the operation of circuitry 196 such as infrared light-emitting diode 22 and infrared image sensor 28 (e.g., using enable signals). For example, control circuitry 16 can direct light-emitting diode 22 to emit a pulse of light while directing image sensor 28 to capture an image frame (e.g., an image frame containing facial information or other user biometric information). In some configurations, control circuitry 16 may gather light measurements from a light sensor such as infrared light sensor 198 (e.g., an infrared photodetector such as a photodiode).

Figure 16:
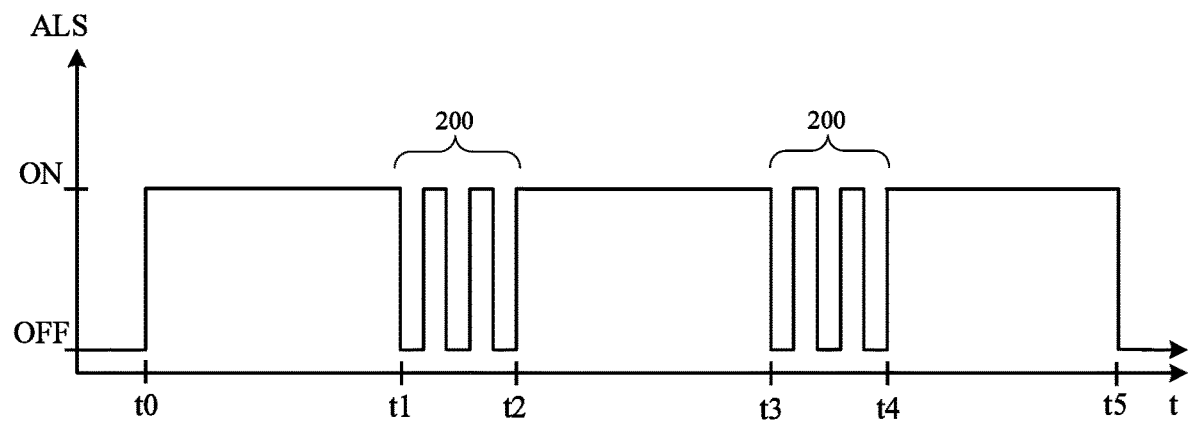
FIGS. 16, 17, and 18 are timing diagrams showing illustrative signals involved in using circuitry of the type shown in FIG. 15 to coordinate the use of an ambient light sensor and a component containing an infrared light-emitting diode in accordance with an embodiment.
Figure 17:
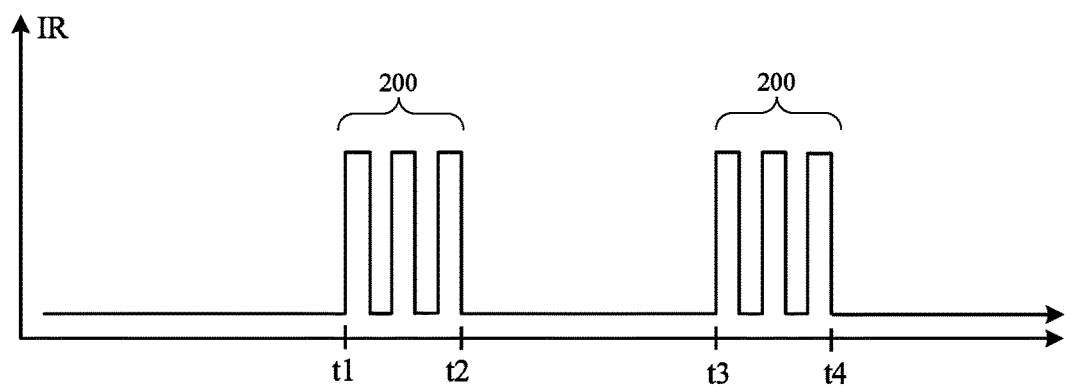

In one illustrative arrangement, control circuitry 16 uses switches 192 and 194 to momentarily pause the integration of ambient light sensor signals whenever infrared-light-emitting diode 22 is being used to emit a pulse of infrared illumination. This helps prevent infrared-induced noise in the visible ambient light measurements being made with ambient light sensor 30. Consider, as an example, the scenario of FIGS. 16 and 17. In this arrangement, control circuitry 16 is using ambient light sensor 30 to measure ambient light over a time period that extends from time t0 to time t5. The duration of this period (e.g., t5-t0) may be, for example, 100-700 ms, at least 25 ms, at least 40 ms, at least 75 ms, at least 150 ms, at least 300 ms, less than 150 ms, less than 500 ms, less than 700 ms, less than 900 ms, or other suitable time period.

Control circuitry 16 may capture images with infrared image sensor 28 during ambient light sensor data acquisition. For example, a user may awaken device 10 from a sleep state to use device 10. Immediately upon awakening device 10 (e.g., at a time such as time t0), control circuitry 16 may begin capturing image data with circuitry 196 (e.g., to allow a user to biometrically authenticate as an authorized user of device 10) while beginning to gather ambient light sensor measurements with ambient light sensor 30 (e.g., so that screen brightness of display 14 can be adjusted based on the ambient light sensor data as device 10 exits sleep mode). Because the infrared illumination produced by light-emitting diode 22 has the potential to create noise in the signal measurements gathered with ambient light sensor 30, control circuitry 16 can synchronize the operation of circuitry 196 and ambient light sensor 30. In particular, each time control circuitry 16 directs light-emitting diode 22 to output infrared light (for illuminating external objects being imaged by image sensor 28), control circuitry 16 may also direct ambient light sensor 30 to temporarily pause the gathering (integrating) of ambient light sensor data.

Figure 18:
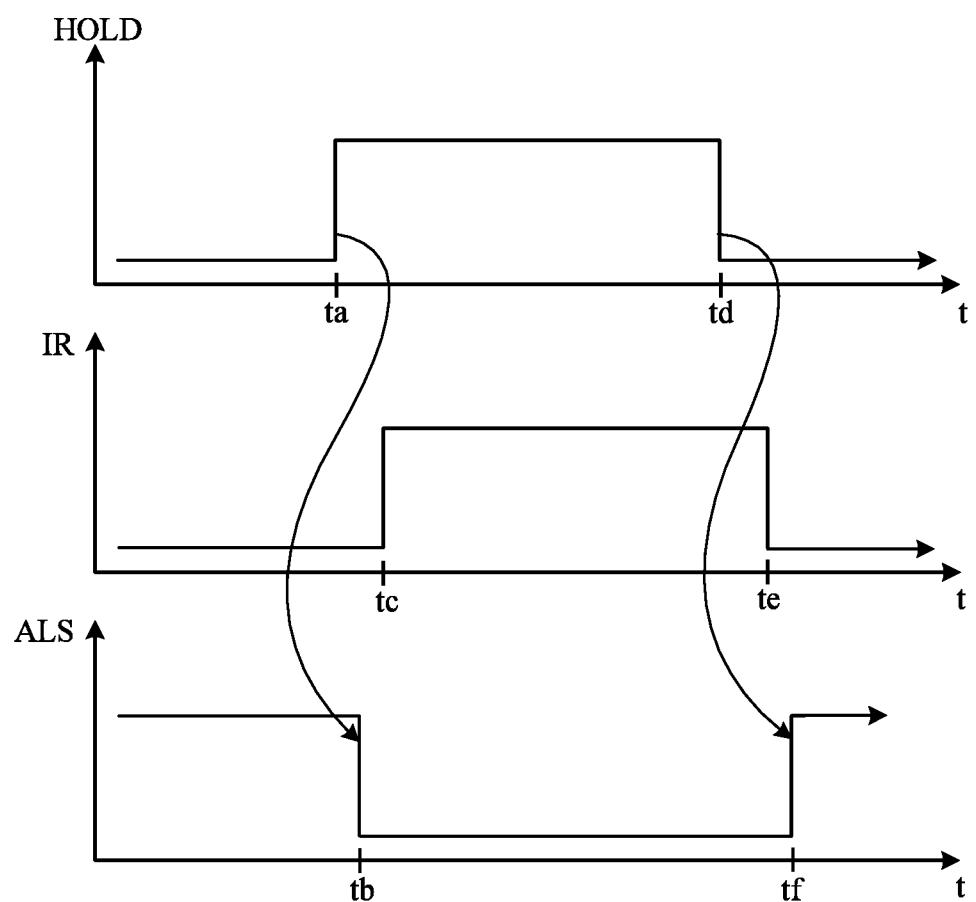

As shown in FIG. 18, the infrared light output (IR) of light-emitting diode 22 may be supplied in one or more sets of pulses 200. Each set of pulses 200 may include one or more pulses of light (e.g., at least 1, at least 2, at least 4, at least 8, at least 15, at least 20, fewer than 100, fewer than 25, fewer than 10, etc.). The pulses may each have a duration of 3 ms, at least 1 ms, less than 5 ms, or other suitable duration. During each pulse (or multiple pulses), a corresponding image frame may be acquired by image sensor 28. The use of pulsed light may allow light-emitting diode 22 to produce a higher peak light output than would be possible if using continuous illumination, thereby reducing signal-to-noise during image capture operations with infrared image sensor 28. Pulsed light may also help reduced thermal loads and enhance battery life. The light intensity produced by light-emitting diode 22 may be relatively high, so control circuitry 16 can pause ambient light sensor data gathering (e.g., integration by integrating analog-to-digital converter 190) each time light-emitting diode 22 is producing output, as shown by the complementary shapes of the pulses in FIGS. 16 and 17.

To ensure that ambient light sensor integration operations have been successfully paused before any infrared light is emitted by light-emitting diode 22, control circuitry 16 can assert the HOLD signal before turning light-emitting diode 22 on. As shown in FIG. 18, for example, HOLD can be asserted at time ta. After a short delay (e.g., a delay of about 5 microseconds), switch 192 will close, switch 194 will open, and converter 190 will pause integration (e.g., at time tb). Light-emitting diode 22 may then generate output at time tc without risk of creating interference for the ambient light sensor. Similarly, light-emitting diode 22 may be turned off (time te) before ambient light sensor integration resumes (time tf). There may be a short delay between the release of signal HOLD and the resumption of ambient light sensing (switch 192 open, switch 194 closed, and converter 190 integrating). As a result, hold signal HOLD may, if desired, be deasserted at a time td that is slightly before light-emitting diode 22 is turned on to produce infrared output IR at time te, provided that ambient light sensor 30 becomes active (pausing ceases) at a time tf that is later than time te.

Figure 19:
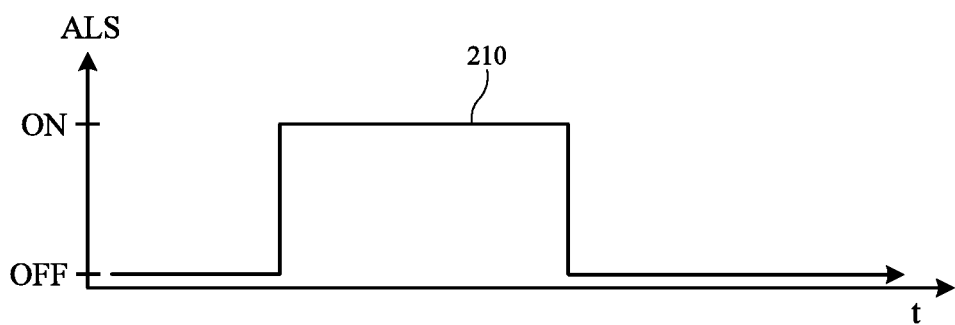
FIGS. 19 and 20 are timing diagrams showing how a flag signal may be asserted during ambient light sensor data gathering operations in accordance with an embodiment.
Figure 20:
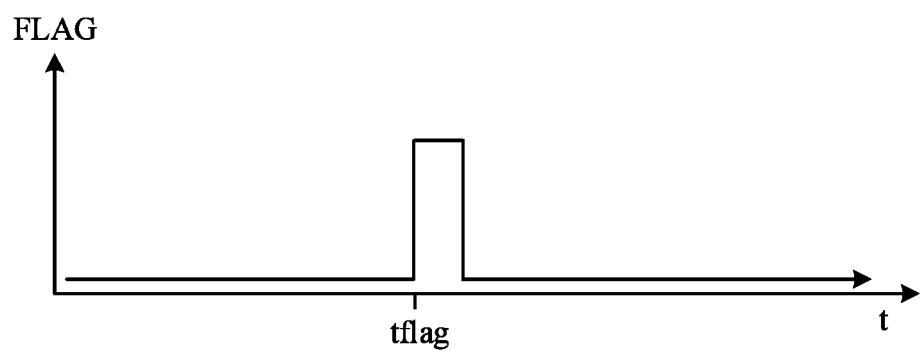

If desired, control circuitry 16 may use ambient light sensor 30 without pausing ambient light sensor 30 during light emission from light-emitting diode 22. In the event that infrared light-emitting diode 22 is activated during the operation of ambient light sensor 30 (e.g., in the event that control circuitry 16 uses light-emitting diode 22 and image sensor 28 to capture images while ambient light sensor 30 is providing output that is being integrated by integrating analog-to-digital converter 190), control circuitry 16 can indicate that potential contamination of the ambient light sensor reading by emitted light from diode 22 has occurred (e.g., by setting a flag). Control circuitry 16 can then discard the ambient light sensor reading that has potentially been contaminated by light from diode 22 or can assert a bit to indicate that ambient light sensor data may be contaminated by infrared light. FIG. 19 shows how ambient light data may be gathered by integrating an ambient light sensor photodiode current over period 210 (shown by the period that ALS is on in FIG. 19). FIG. 20 shows how a flag (FLAG) can be asserted during the ambient light sensor integration period (e.g., at time tflag) to indicate that light-emitting diode 22 has emitted infrared light during the use of ambient light sensor 30 to gather an ambient light sensor measurement. In response to determining that FLAG has been asserted during an ambient light sensor integration period (e.g., period 210 of FIG. 19), control circuitry can discard the potentially contaminated ambient light sensor data from sensor 30 and can gather a new ambient light sensor measurement.

Another way in which to avoid potential contamination from infrared light involves the use of an infrared light sensor such as sensor 198 to determine when infrared light is being emitted. Sensor 198 may, for example, be used by control circuitry 16 to monitor for the presence of infrared light pulses from external light-emitting circuitry. As an example, sensor 198 may detect that infrared light has been emitted by circuitry 196 (e.g., an infrared light-emitting diode 22 that is providing illumination of external objects being imaged by a corresponding infrared light sensor 28) in a device other than device 10. These potentially contaminating infrared light pulses may be emitted from nearby electronic devices (e.g., one or more electronic devices other than device 10) such as devices operated by other users. When infrared light pulses or other potentially contaminating infrared light is detected in the vicinity of device 10 using sensor 198, a flag such as signal FLAG of FIG. 20 may be asserted. Ambient light sensor data integrated over a period of time that overlaps the asserted flag may then be discarded.

The foregoing is merely illustrative and various modifications can be made to the described embodiments. The foregoing embodiments may be implemented individually or in any combination.

What is claimed is:

1. An ambient light sensor configured to provide ambient light measurements to control circuitry in an electronic device, the ambient light sensor comprising:
   a light detector integrated circuit;
   a light guide configured to guide ambient light to the light detector integrated circuit, wherein the light guide comprises a core and a cladding surrounding the core, wherein the core has a first index of refraction, wherein the cladding has a second index of refraction that is less than the first index of refraction, and wherein at least a portion of the ambient light passes through the core without first passing through the cladding; and
   an infrared-blocking filter through which the ambient light passes.

2. The ambient light sensor defined in claim 1 further comprising a light diffuser, wherein the light guide is interposed between the light diffuser and the infrared-blocking filter.

3. The ambient light sensor defined in claim 2 further comprising:
   a support structure surrounding the cladding of the light guide, wherein the cladding is interposed between the support structure and the core.

4. The ambient light sensor defined in claim 3 wherein the cladding comprises polymer, the ambient light sensor further comprising an opaque support structure surrounding the light detector integrated circuit and the light guide.

5. The ambient light sensor defined in claim 4 wherein the light detector integrated circuit includes a plurality of photodetectors.

6. The ambient light sensor defined in claim 5 further comprising a plurality of color filters, each color filter passing a different respective range of visible light wavelengths to a respective one of the plurality of photodetectors.

7. The ambient light sensor defined in claim 6 wherein the light diffuser includes a plurality of light diffuser layers each light diffuser layer having a substrate and a polymer coating on the substrate that has embedded light scattering particles.

8. The ambient light sensor defined in claim 7 wherein the plurality of light diffuser layers includes first and second light diffuser layers separated by an air gap.

9. The ambient light sensor defined in claim 6 wherein the infrared-blocking filter includes at least one stack of thin-film dielectric layers of alternating refractive index values.

10. The ambient light sensor defined in claim 7 wherein the infrared-blocking filter includes a glass substrate on which the thin-film dielectric layers are formed.

11. The ambient light sensor defined in claim 10 wherein the glass substrate comprises infrared-light-blocking glass.

12. The ambient light sensor defined in claim 11 wherein the color filters each include a stack of thin-film inorganic dielectric layers that is configured to pass a respective range of visible light wavelengths while blocking infrared light.

13. An electronic device, comprising:
an array of pixels;
a display cover layer that overlaps the pixels;
an optical component window in a portion of the display cover layer through which ambient light passes; and
a color ambient light sensor aligned with the optical component window, wherein the color ambient light sensor includes:
an opaque support structure;
a light diffuser coupled to the opaque support structure through which the ambient light passes, wherein the light diffuser has a peripheral edge and wherein the opaque support structure extends around the peripheral edge;
a light detector integrated circuit that is at least partially surrounded by the opaque support structure, wherein the light detector integrated circuit has a plurality of photodetectors each overlapped by a color filter that is configured to pass a different respective band of visible light wavelengths;
an infrared-light-blocking filter that is coupled to the support structure and that is located between the light diffuser and the light detector integrated circuit; and
a layer of black ink through which the ambient light passes prior to passing through the light diffuser.

14. The electronic device defined in claim 13 wherein the color filters each include organic material and wherein the color ambient light sensor further comprises an infrared-light-blocking thin-film interference filter having thin-film inorganic dielectric layers between the color filters and the light detector integrated circuit.

15. The electronic device defined in claim 13 wherein the light diffuser comprises multiple light diffuser layers, each of the light diffuser layers including a substrate layer coated with a polymer containing light scattering particles of inorganic dielectric.

16. The electronic device defined in claim 13 wherein the infrared-light-blocking filter comprises a plurality of infrared-light-blocking layers each infrared-light-blocking layer including a substrate and a thin-film interference filter formed from a stack of dielectric layers of alternating index of refraction on the substrate.

17. The electronic device defined in claim 13 further comprising:
an infrared light-emitting diode configured to emit infrared light that is blocked by the infrared-light-blocking filter; and
an infrared sensor configured to capture images illuminated by the emitted infrared light.

18. The electronic device defined in claim 13 further comprising control circuitry configured to adjust a white point of images displayed on the array of pixels in response to color ambient light sensor information measured with the color ambient light sensor.

19. An electronic device, comprising:
a display having a display cover layer;
an ambient light sensor window in the display cover layer; and
an ambient light sensor configured to receive ambient light through the ambient light sensor window, wherein the ambient light sensor comprises:
a light detector integrated circuit having a plurality of photodetectors each overlapped by a color filter configured to pass a different respective band of visible light wavelengths; and
a visible-light-transmitting-and-infrared-light blocking thin-film interference filter interposed between the color filters and the ambient light sensor window, wherein the visible-light-transmitting-and-infrared-light blocking thin-film interference filter comprises a glass infrared-blocking substrate having opposing first and second surfaces, a first thin-film interference filter directly on the first surface, and a second thin-film interference filter directly on the second surface, wherein the visible-light-transmitting-and-infrared-light blocking thin-film interference filter has a peripheral edge, and wherein an opaque support structure extends around the peripheral edge.

20. The electronic device defined in claim 19 further comprising:
an infrared light-emitting diode configured to emit infrared light that is blocked by the visible-light-transmitting-and-infrared-light blocking thin-film interference filter; and
an infrared sensor configured to capture images illuminated by the emitted infrared light.

21. An electronic device, comprising:
an ambient light sensor photodetector;
an integrating analog-to-digital converter configured to integrate output from the ambient light sensor photodetector;
an infrared light-emitting diode;
control circuitry configured to pause integration of the output every time the infrared light-emitting diode is turned on; and
switching circuitry interposed between the ambient light sensor photodetector and the integrating analog-to-digital converter, wherein the switching circuitry is configured to shunt the output to the ground when the infrared light-emitting diode is turned on.

22. The electronic device defined in claim 21 wherein the switching circuitry is coupled to the ambient light sensor photodetector and wherein the control circuitry is configured to adjust the switching circuitry when using the infrared light-emitting diode to emit infrared light.

23. The electronic device defined in claim 22 wherein the switching circuitry comprises:
a first switch that is coupled between a node and an input of the integrating analog-to-digital converter; and a second switch that is coupled between the node and ground.

24. The electronic device defined in claim 23 wherein the ambient light sensor photodetector has a first terminal coupled to ground and a second terminal coupled to the node.

25. The electronic device defined in claim 24 wherein the switching circuitry is configured to operate in:
    a first mode in which the first switch is closed to couple the output of the ambient light sensor photodetector to the input of the integrating analog-to-digital converter to allow the integrating analog-to-digital converter to integrate the output from the ambient light sensor photodetector and the second switch is open to isolate the node from ground; and
    a second mode in which the first switch is open to disconnect the output of the ambient light sensor photodetector from the input of the integrating analog-to-digital converter and the second switch is closed to short the node to ground.

26. The electronic device defined in claim 25 further comprising an infrared image sensor configured to capture an image of an external object illuminated by infrared light emitted by the infrared light-emitting diode while the switching circuitry is operated in the second mode.

27. An electronic device, comprising:
    an ambient light sensor configured to gather an ambient light sensor measurement during an integration period;
    integration circuitry that produces integrated ambient light sensor data based on the ambient light sensor measurement;
    an infrared light-emitting diode; and
    control circuitry configured to discard the integrated ambient light sensor data in response to determining that the infrared light-emitting diode has emitted infrared light during the integration period.

28. The electronic device defined in claim 27 further comprising an infrared image sensor configured to capture an image of an external object illuminated by infrared light emitted by the infrared light-emitting diode.

29. The electronic device defined in claim 28 wherein the ambient light sensor comprises a light detector integrated circuit having a plurality of photodetectors each overlapped by a color filter configured to pass a different respective band of visible light wavelengths.

30. An electronic device, comprising:
    an ambient light sensor configured to gather an ambient light sensor measurement during an integration period;
    integration circuitry that produces integrated ambient light sensor data based on the ambient light sensor measurement;
    an infrared light sensor; and
    control circuitry configured to discard the integrated ambient light sensor data in response to determining that the infrared light sensor has sensed infrared light during the integration period.

31. The electronic device defined in claim 30 wherein the ambient light sensor comprises a light detector integrated circuit having a plurality of photodetectors each overlapped by a color filter configured to pass a different respective band of visible light wavelengths.

32. The electronic device defined in claim 31 further comprising a display, wherein the control circuitry is configured to adjust a white point of images displayed on the display based on the ambient light sensor measurement.

33. An electronic device, comprising:
    a rectangular housing having four peripheral edges including an upper peripheral edge;
    an electrical component;
    an optical component window;
    a photodetector;
    a display cover layer, wherein the electrical component is separated from the display cover layer by a first distance and the photodetector is separated from the display cover layer by a second distance that is less than the first distance;
    a light guide that is interposed between the electrical component and a sidewall of the rectangular housing and that is configured to guide ambient light from the optical component window past the electrical component to the photodetector, wherein the light guide has opposing first and second ends;
    a light diffuser attached to the first end of the light guide; and
    an infrared-light-blocking filter interposed between the second end of the light guide and the photodetectors.

34. The electronic device defined in claim 33 further comprising:
    an array of pixels
    wherein the display cover layer that overlaps the pixels, wherein the optical component window is formed in a portion of the display cover layer.

35. The electronic device defined in claim 34 wherein the optical component window has an elongated shape that extends parallel to the upper peripheral edge and that is between the electrical component and the sidewall of the rectangular housing.

36. The electronic device defined in claim 35 wherein the electrical component comprises a speaker aligned with a speaker port formed in the display cover layer and wherein the speaker port has an elongated shape that extends parallel to the optical component window.

37. The electronic device defined in claim 36 further comprising a light detector integrated circuit on which the photodetector is formed.

38. The electronic device defined in claim 37 wherein the photodetector is one of multiple photodetectors each of which is configured to measure ambient light of a different color.

39. The electronic device defined in claim 38 further comprising thin-film interference filters with different respective pass bands each of which overlaps a respective one of the multiple photodetectors.

40. The electronic device defined in claim 38 further comprising an opaque support structure surrounding the light guide, wherein the light guide has a core with a first index of refraction and a cladding with a second index of refraction that is lower than the first index of refraction.

41. The electronic device defined in claim 33 further comprising:
    an infrared digital image sensor mounted adjacent to the upper peripheral edge; and
    an infrared light-emitting diode configured to supply illumination for infrared images captured with the infrared digital image sensor.

42. The electronic device defined in claim 41 wherein the photodetector is one of multiple photodetectors each of which is configured to measure ambient light of a different color and wherein each of the multiple photodetectors is overlapped by a respective thin-film interference filter with a different respective visible-light pass band.

43. The electronic device defined in claim 42 wherein the thin-film interference filters are configured to block infrared light.

\* \* \* \* \*